United States Patent
Leifker et al.

(10) Patent No.: US 12,302,780 B2
(45) Date of Patent: May 20, 2025

(54) SITE-SPECIFIC SEED ORIENTATION

(71) Applicant: Deere & Company, Moline, IL (US)

(72) Inventors: Jeremy A. Leifker, Grimes, IA (US); Cole L Murray, Polk City, IA (US); Thomas G. Mueller, Waukee, IA (US); Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 835 days.

(21) Appl. No.: 17/543,575

(22) Filed: Dec. 6, 2021

(65) Prior Publication Data

US 2022/0087097 A1   Mar. 24, 2022

Related U.S. Application Data

(63) Continuation of application No. PCT/US2020/070128, filed on Jun. 8, 2020.

(60) Provisional application No. 62/858,971, filed on Jun. 7, 2019.

(51) Int. Cl.
*A01C 21/00* (2006.01)
*G05B 15/02* (2006.01)

(52) U.S. Cl.
CPC ............ *A01C 21/005* (2013.01); *G05B 15/02* (2013.01)

(58) Field of Classification Search
CPC ....... A01C 21/005; A01C 5/068; A01C 7/105; A01C 7/20; G05B 15/02
See application file for complete search history.

(56) References Cited

U.S. PATENT DOCUMENTS

| | | | |
|---|---|---|---|
| 4,321,972 A | 3/1982 | Robertson et al. | |
| 8,150,554 B2* | 4/2012 | Anderson | G06Q 50/06 701/50 |
| 9,538,714 B2 | 1/2017 | Anderson | |
| 9,901,026 B2 | 2/2018 | Kinzenbaw et al. | |
| 2008/0131254 A1 | 6/2008 | Cope et al. | |
| 2012/0073416 A1 | 3/2012 | Becker et al. | |

(Continued)

FOREIGN PATENT DOCUMENTS

| | | |
|---|---|---|
| WO | 2018013858 | 1/2018 |
| WO | 2018013859 | 1/2018 |

(Continued)

OTHER PUBLICATIONS

Extended European Search Report and Written Opinion issued in European Patent Application No. 20819202.1, dated Jul. 20, 2023, in 10 pages.

(Continued)

*Primary Examiner* — Calvin Cheung
(74) *Attorney, Agent, or Firm* — Hanley, Flight & Zimmerman, LLC

(57) ABSTRACT

A method for planting a seed (124) with a desired planted seed orientation (141) within an agricultural field (90), the method comprising: determining, with a processor (140), a seed orienter (120) position within the agricultural field (90) using position data from at least one of a planter (302) or an agricultural vehicle (300); determining, with the processor (140), the desired planted seed orientation (141) for the seed orienter (120) position within the agricultural field (90); and planting the seed (124) according to the desired planted seed orientation (141) at the position within the agricultural field (90).

40 Claims, 5 Drawing Sheets

(56) References Cited

U.S. PATENT DOCUMENTS

2014/0379228 A1* 12/2014 Batcheller .............. A01C 7/201
 701/50
2017/0251589 A1 9/2017 Tippery et al.

FOREIGN PATENT DOCUMENTS

| WO | 2018013860 | 1/2018 |
|----|------------|--------|
| WO | 2018013861 | 1/2018 |
| WO | 2019025773 | 2/2019 |

OTHER PUBLICATIONS

International Searching Authority, "International Search Report and Written Opinion", issued in connection with PCT Patent Application No. PCT/US2020/070128, mailed on Aug. 18, 2020, 12 pages.

* cited by examiner

| Desired Planted Orientations | | Description |
|---|---|---|
| 1 | 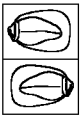 | On side, parallel or perpendicular to the row |
| 2 |  | Upright, caryopsis pointed down, parallel or perpendicular to the row |
| 3 |  | Upright, caryopsis pointed up, parallel or perpendicular to the row |
| 4 | 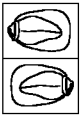 | Laying flat embryo up, parallel to the row |
| 5 | 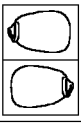 | Laying flat embryo down, parallel to the row |
| 6 | 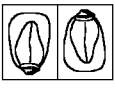 | Laying flat embryo up, perpendicular to the row |
| 7 | 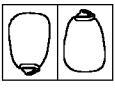 | Laying flat embryo down, perpendicular to the row |
| 8 | | Random |

FIG. 4

SITE-SPECIFIC SEED ORIENTATION

CROSS-REFERENCE TO RELATED APPLICATIONS

This patent arises from an application that is a continuation of International Application No. PCT/US20/70128, filed Jun. 8, 2020, which claims the benefit of and priority to U.S. Provisional Application No. 62/858,971, filed Jun. 7, 2019. The priority of International Application No. PCT/US20/70128 and U.S. Provisional Application No. 62/858,971 are hereby claimed and International Application No. PCT/US20/70128 and U.S. Provisional Application No. 62/858,971 are hereby incorporated herein by reference.

TECHNICAL FIELD

The present disclosure relates generally to a system and method for planting a seed using site-specific seed orientation.

BACKGROUND

Agricultural machines are utilized for a wide variety of agricultural operations. For instance, agricultural machines can be utilized to plant crops, provide crop care operations (spraying, watering, fertilizing, etc.), harvesting operations, to name a few. In traditional agricultural operations, an agricultural machine includes or otherwise supports an agricultural implement such as tools for operation such as tillage, planting, spraying, baling, reaping, etc.

In many agricultural systems it is often desirable to determine the characteristics of the area for which an operation is to be performed and generate site-specific recommendations. Some work has been done in sensing characteristics of a field and tagging the sensed characteristic with a geographic location, to generate maps or other georeferenced data between the sensed characteristics and their location within the field. Some systems sense characteristics in a field using images that a can be captured and processed to obtain relevant data.

The discussion above is merely provided for general background information and is not intended to be used as an aid in determining the scope of the claimed subject matter.

SUMMARY

A method for planting a seed in an agricultural field, the method comprising: determining, with a processor, a position of a seed orienter within the agricultural field using position data from at least one of a planter or an agricultural vehicle; determining, with the processor, a desired planted seed orientation corresponding to the position of the seed orienter within the agricultural field; and planting the seed with the seed orienter according to the desired planted seed orientation within the agricultural field.

method for planting a seed with a desired planted seed orientation within an agricultural field, the method comprising: determining, with a processor, a seed orienter position within the agricultural field using position data from at least one of a planter or an agricultural vehicle; determining, with the processor, the desired planted seed orientation for the seed orienter position within the agricultural field; and planting the seed according to the desired planted seed orientation at the position within the agricultural field.

A method for planting a seed in an agricultural field with a planter according to a seed orientation instruction, the method comprising: determining, with a processor, a position of the planter within the agricultural field; determining, with the processor, the seed orientation instruction for the position of the planter within the agricultural field; planting the seed according to the seed orientation instruction at the position in the field; and verifying that a planted seed orientation at the position in the field corresponds to the seed orientation instruction.

A method for planting a seed with a planter according to a seed orientation instruction for an agricultural field, the method comprising: determining, with a processor, a position of the planter within the agricultural field; determining, with the processor, the seed orientation instruction for the position of the planter within the agricultural field; planting the seed according to the seed orientation instruction at the position in the field; determining if a planted seed orientation of the seed at the position in the field corresponds to the seed orientation instruction; and adjusting the planted seed orientation if the planted seed orientation at the position in the field does not correspond to the seed orientation instruction.

A system for planting a seed within an agricultural field, the system comprising: a planter configured to plant a seed in a desired planted seed orientation, the desired planted seed orientation having an orientation of the seed in three dimensions relative to the ground; and a processor, the processor receiving the desired planted seed orientation for a position of the planter within the agricultural field and, based on the position of the planter, controlling the planter to plant the seed in the desired planted seed orientation.

A system for planting a seed within an agricultural field, the system comprising: a planter; a seed orienter associated with the planter; and a processor, the processor receiving a seed orientation instruction for the agricultural field and position data of the planter within the agricultural field and, based on the seed orientation instruction and the position data, controlling the seed orienter to plant the seed in a desired planted seed orientation.

BRIEF DESCRIPTION OF THE DRAWINGS

The detailed description of the drawings refers to the accompanying figures in which:

FIG. 4 illustrates possible desired planted seed orientations of a corn seed.

DETAILED DESCRIPTION OF THE DRAWINGS

Figure 1:
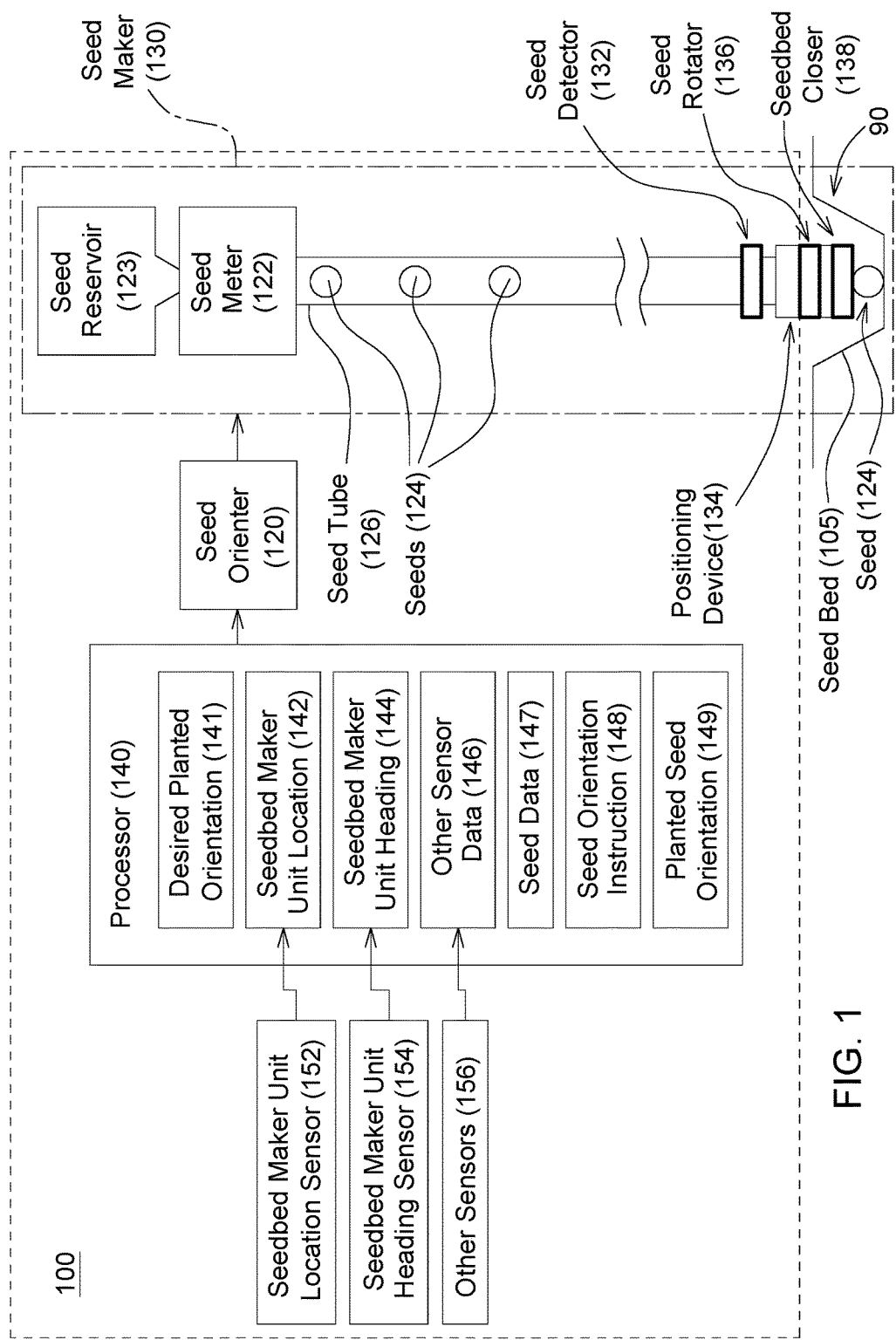
FIG. 1 is a block diagram of one example of a site-specific seed orientation system.

With respect to emergence, it is known that significant yield loss can occur when emergence of plants within a stand are delayed. See, e.g., Ford, J. H. and D. R. Hicks. 1992, Corn growth and yield in uneven emerging stands, J. of Production Agriculture, 5:185-188; Liu, W., Tollenaar, M., Stewart, G. and Deen, W, 2004, Response of corn grain yield to spatial and temporal variability in emergence, Crop Sci.

44:847-854; and Heiniger, R. W. and L. Boerema, 2015, How important is uniform emergence in corn, In 2015, Agronomy Abstracts, ASA. Thus, controlling the operation of an agricultural process by utilizing site specific data for the area being planted allows for certain early season benefits in terms of time to emergence and light capture. For example, with respect to the process of planting seeds in an agricultural field, seeds placed in a desired planted seed orientation will impact later developing features of the plant such as leaf, root and grain orientation. Optimizing the desired planted seed orientation of the seed in a seedbed, and then ensuring the actual planted seed orientation corresponds to the desired planted seed orientation, allows for optimal contact with the soil, uniform emergence and plant growth, optimal and uniform utilization of inputs such as light, water and nutrients, and avoiding other causes of yield loss such as soil compaction or machine contact with the plant or grain.

For example, leaf orientation relative to neighboring plants can impact light intercepted by the leaves and plant behaviors such as shade avoidance. Additionally, by increasing the amount of shade through leaf orientation, weed presence and pressure may be reduced. Similarly, root orientation can impact a plant's ability to locate applied nutrients or impact competition between plants and weeds for nutrients. Finally, the grain, flower, fruit or ear orientation—and specifically corn ears—produced by the plant may be located on a stalk/stem relative to as-planted seed orientation. Ensuring the corn ears are in series within a row (e.g., row 102 best seen in FIG. 3) can help minimize in-season contact between the grain with machinery and reduce grain loss at harvest. However, it can be appreciated by one ordinary skill that row 102 may not be a conventional series of parallel rows but can include any number of patterns to aid in the growth of the crop. Some crops or crop varieties have an initial leaf and/or root orientation relative to the orientation of the seed. For example, with kernels planted tip down, the first leaves of the corn plant generally emerge parallel to the germ. Torres, Guilherme, Leaf Angle and Emergence as Affected by Seed Orientation at Planting, *Experimental Agricultural*, Volume 47, Issue 4 October 2011, pp. 579-592. Similarly, other features should be optimized including topography (sunlight capture, heat, water); row direction (soil compaction, machinery contact, harvest); prevailing winds (seedling "helicoptering," pollination, mildew prevention, etc.); and future equipment paths or tramline proximity (soil compaction, machinery contact, sunlight).

FIG. 1 shows a block diagram of an exemplary site-specific seed orientation system 100. The system 100 operates in a worksite (e.g., agricultural field) 90 comprising some number of seedbeds 105 such as crop rows 102 (best seen by the dashed lines in FIG. 3). In one example, using position data corresponding to the position and heading of an agricultural tractor and/or implement within an agricultural field, the system 100 comprising at least one seed orienter 120, each seed orienter 120 having an associated seedbed maker 130 plants seeds 124 at a given position within the agricultural field according to a seed orientation instruction 148. In one example, the seed orientation instruction has a desired planted seed orientation 141 which includes multi-dimensional position information of the seed relative to the surface plane (i.e., ground level), seed planting depth and crop row for a given position within the agricultural field 90. In one example, multi-dimensional position information is provided such that seed has a position (e.g., within row 102) and/or an orientation in three-dimensional Cartesian coordinates (X, Y, and Z) at that position. In this example, the Cartesian coordinates would have an origin corresponding to some point on the seed and then X, Y, and Z axis lines. The seed orienter 120 would then be configured to adjust the pitch, roll and yaw (orthogonal axes and resulting coordinates) of the seed using the multi-dimensional position information.

Seedbed maker 130 may be a high-speed row unit as disclosed in U.S. Pat. No. 8,850,998, which is incorporated by reference in its entirety. In this example, seedbed maker 130 has disposed thereon a seedbed forming device (not shown) and a seed meter 122 which singulates seeds 124 from a seed reservoir 123 having a pool of seeds into a seed delivery system 126. The seed delivery system 126 may be configured to convey the seed 124 some distance to the seedbed 105 while retaining the seed in its desired planted seed orientation 141.

It can be appreciated by one ordinary skill that a seed 124 may be planted in a seedbed 105, the seedbed 105 being formed in any number of ways such as a furrow, pocket, indentation, hole, opening or any other shape or position from which the seed 124 can grow to a plant. In one example, the seedbed 105 is formed with the seedbed forming device to create a conventional "V" shaped furrow. However, in another example, the seed 124 is not deposited in a "V" shaped furrow in conventional parallel rows. Instead, the seedbed maker 130 is an injection system whereby seed 124 is injected into uniquely shaped pockets in the soil 95 (best seen in FIG. 5), the pockets being created in varying geometries and patterns within the worksite/field 90 such that the seed 124 is placed in optimal spacing and contact with the soil 95. For example, the seedbed maker 130 may create a specific shape of seedbed 105 to be aid planting of the seed 124 in its desired planted seed orientation 141. In can be appreciated then by one of ordinary skill that seedbed maker 130 may utilized any number of methods may be utilized to form different seedbed styles and shapes and plant the seed 124 in that seedbed 105.

In one example, to achieve an actual planted seed orientation 149 which corresponds to the desired planted seed orientation 141, seed orienter 120 further comprises a seedbed maker 130 to orient the seed 124 in the desired planted seed orientation 141 in seedbed 105. In FIG. 1, seed orienter 120 may include adjustment of the seed orientation in one or more of the X, Y and Z dimensions at one or more locations on the seedbed maker 130 including, for example, the seed meter 122, seed delivery system 126, or seed detector 132. Seedbed maker 130 may include one or more components at various locations to adjust the seed orientation such as positioning device 134, seed rotator 136 and/or seedbed closer 138. In one example, seedbed maker 130 may be controlled by processor 140 based on a desired planted seed orientation 141. Desired planted seed orientation 141 may be determined prior to planting of the seed 124 using the seed orientation instruction 148, seedbed maker location 142 from a seedbed maker location sensor 152, a seedbed maker heading 144 from a seedbed maker heading sensor 154, other sensor data 146 and other sensors 156.

Some existing components of seedbed maker 130 may provide initial orientation of the seed 124 before the seed 124 is planted. For example, the seed meter 122 may have a seed disk with seed indentations thereon to uniformly orient the seed. While this may provide some initial orientation, the seeds 124 may deviate from the desired planted seed orientation 141 as they travel towards the seedbed 105. For example, in a seedbed maker 130 with a conventional seed tube, the seed 124 may bounce off the sides of the tube as the seed freefalls to the seedbed 105, resulting in a random seed orientation and failing to achieve, on its own, the necessary desired planted seed orientation 141. In another example, it has been observed that seed delivery systems 126, such as the John Deere ExactEmerge™ row units disclosed in U.S. Pat. No. 8,850,998, may maintain the desired planted seed orientation 141 from seed meter 122 to seedbed 105 by, among other things, eliminating bouncing of the seed 124 in the seed tube. Still further, while the desired planted seed orientation 141 may be maintained all the way to seedbed 105, the seed 124 may still be knocked out of desired planted seed orientation 141 after contacting the seedbed 105 and/or being covered with soil 95.

Figure 5:
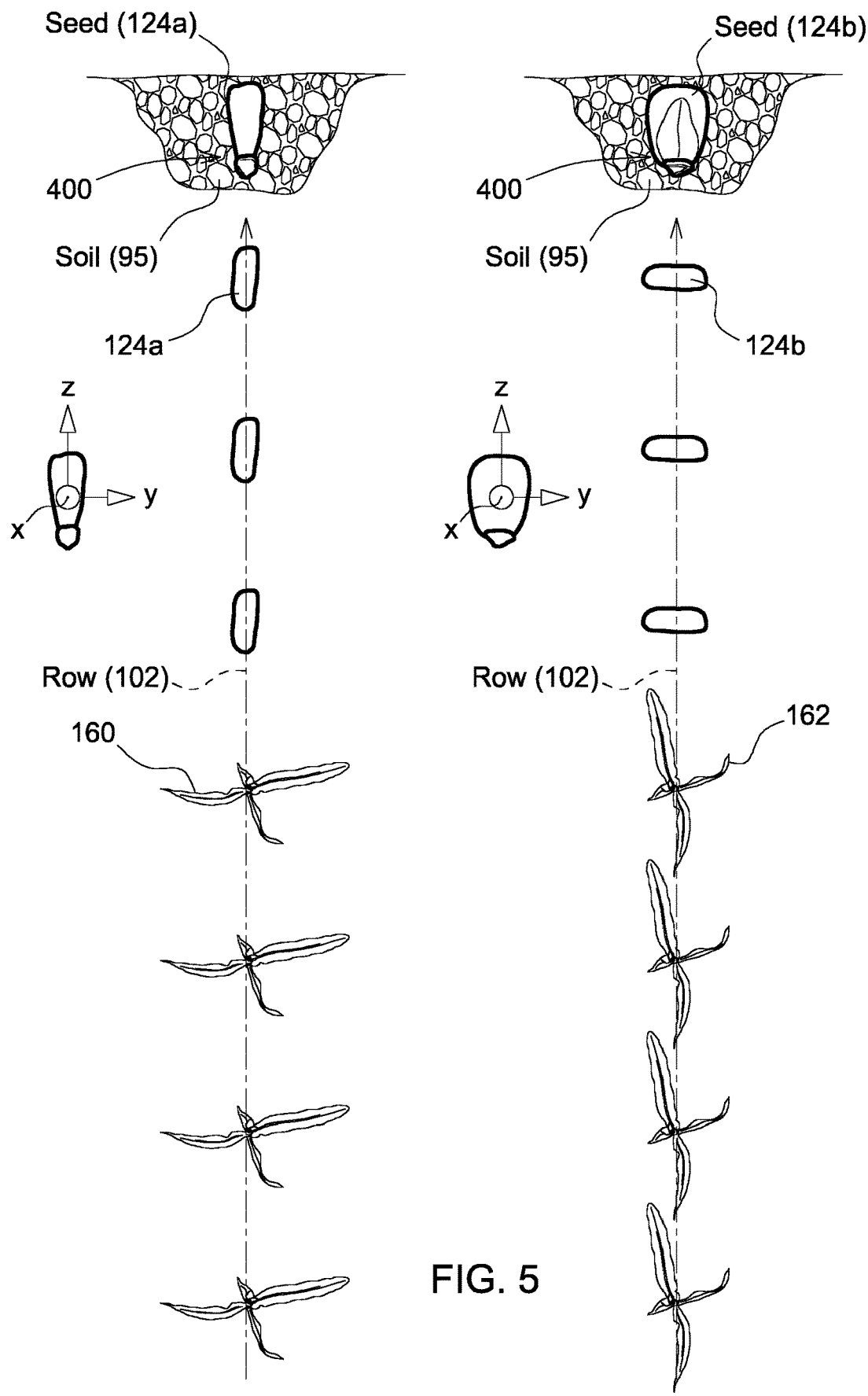
FIG. 5 illustrates a side and top view of two possible desired planted seed orientations of FIG. 4 as planted in a seedbed and a top view of the resulting plants corresponding to each of the two possible desired planted seed orientations.

Thus, additional seed orientation may be required to ensure the seed 124 is planted in the desired planted seed orientation 141. In another example, the positioning device 134 and seed rotator 136 each interact with the seed at some point before the seed is contacted by soil 95 with seedbed closer 138. For example, the positioning device 134 may be used to align the seed 124 in a first dimension or axis while the seed rotator 136 aligns the seed 124 in a second dimension or axis such that the seed is parallel to the row 102 with the caryopsis 400 is pointed down (as best seen in FIG. 5). In one example, positioning device 134 and/or seed rotator 136 is a conventional seed firmer. Positioning device 134 and seed rotator 136 may include various other suitable structure for adjusting the orientation of the seed 124 before the seed 124 is contacted by soil 95. As can be appreciated by one of ordinary skill, the positioning device 134 and seed rotator 136 may also be independent structures working in combination or independently and thus are not limited to a conventional seed firmer.

Seedbed closer 138 may then follow the positioning device 134 or seed rotator 136 and move soil 95 into optimal contact with the seed 124 while preserving the desired planted seed orientation 141. In one example, seedbed closer 138 is a conventional closing wheel or drag chain to move soil 95 into contact with the seed 124. However, as can be appreciated by one of ordinary skill, seedbed closer 138 is not limited to this example and may include other suitable structure to move soil 95 into contact with the seed. Thus, under the control of processor 140, the positioning device 134, seed rotator 136 and seedbed closer 138 may work in combination or independently with the seed meter 122, seed delivery system 126 and a seed detector 132 to provide some initial seed orientation, detect the orientation of the seed 124 within the seedbed 105 and then orient the seed 124 to an actual planted seed orientation 149 which corresponds to the desired planted seed orientation 141.

Accordingly, seed orienter 120 ensures that seeds are planted in the correct position within seedbed 105 of the row 102 and in the desired planted seed orientation 141. Achievement of the desired planted seed orientation 141 may be done at any step between the seed reservoir 123 of seedbed maker 130 and the seedbed 105 or at some combination therebetween. For example, the seed orienter 120 may utilize the positioning device 134, seed rotator 136 or seedbed closer 138 to correct the random orientation of the seed 124 due to seed tube bounce or movement within a seed delivery system 126 by rotating or flipping the seed 124 within a seedbed 105 prior to being covered with soil 95. Under the control of processor 140, the seed orienter 120 ensures that the seed 124 is planted in actual planted seed orientation 149—i.e., singulated, dispensed and covered with soil 95 (e.g., with seedbed closer 138)—that corresponds the desired planted seed orientation 141.

In another example, the seed orienter 120 may act on a seed 124 that has been altered to form an altered seed and facilitate additional seed orientation. In one example, an altered seed may include placing or otherwise affixing a magnetic material on some portion of the seed 124. A corresponding structure(s), such as a chamfer made of an appropriate material reactive (e.g., magnetic) to the altered seed, may be embedded or otherwise positioned near and/or along the seed path in one or segments or portions until the seed reaches the seedbed 105. As the now magnetized seed passes the chamfer, the seed would gain additional seed orientation proximate to the seedbed 105 in a repeatable manner to aid in achieving the desired planted seed orientation 141. In another example, the seed 124 is altered by marking the seed with a symbol or other designation representing the desired planted seed orientation 141 of the seed 124. In one example, altered seeds—whether by marking or applying magnetic material—may be done either onboard or offboard an agricultural machine by a seed company, distributor, the seed grower or some combination thereof. In one example, the marking may be inside the visible spectrum, outside the visible spectrum (e.g., near or medium infrared) or some combination thereof. In this example, the marking (similarly applicable to a seed with magnetic material) would be detected and captured by a seed detector 132 and then a representative signal sent to processor 140. The processor 140 could then interpret the marking and send an instruction to seed orienter 120 to adjust the orientation of the seed 124 to the desired planted seed orientation 141. The adjustment to the desired planted seed orientation 141 may take place prior to the seed 124 being placed in seedbed 105, within the seedbed 105 or some combination thereof. As can be appreciated by one of ordinary skill, the altered seed and reactive corresponding structure is not limiting and other means and methods for altering a seed and/or adding seed orientation may be implemented.

In some examples, processor 140 utilizes an open or closed loop orientation control to provide an actual planted seed orientation 149 matching the desired planted seed orientation 141. In this example, the processor 140 may utilize a seed detector 132, such as a camera, to verify seed orientation by observing the planted seed orientation 149 and send a representative signal to the processor 140 for comparison against the desired planted seed orientation 141. The verified seed orientation, the observed seed orientation and/or the comparison thereof may be further be stored in a database for later access. The seed detector 132 may be disposed in locations such as the seed meter 122, the seed delivery system 126, the seedbed 105 or at some other point prior to the seed 124 being covered by soil 95. Upon comparing the actual planted seed orientation 149 to the desired planted seed orientation 141, the processor 140 may initiate adjustments of the seed orienter 120 needed to bring the actual planted seed orientation 149 in line with the desired planted seed orientation 141. These adjustments may be displayed to an operator on an associated display component (not shown) and may be implemented manually or automatically.

Referring further to FIG. 1, processor 140 includes a receiver, transceiver, or other electronic component that receives the signal or signals from seedbed maker location sensor 152, seedbed maker heading sensor 154 and other sensors 156 (which may include, in one example, a signal from seed detector 132 corresponding to detection of seeds). The processor 140 is configured to use the received signal or signals to determine information regarding the location, heading, placement and/or orientation of a seed 124 or seeds within the seedbed 105. For example, in the illustrated example the processor 140 is coupled to a display component (not shown), which may display the seed orientation instruction 148 and/or display the location and actual planted seed orientation 149 of the seed 124 or seeds in the seedbed 105 to an operator. In some examples, one or both the processor 140 and the display component are disposed remotely. In some examples, the other sensors 156 themselves include a processor or other electronic component that calculates a position of the seed 124 or seeds in the seedbed 105.

In some examples, a GPS (Global Positioning System) 150 unit is also connected to the processor 140 to enable correlation between other sensor data 146, seed data 147, seed orientation instruction 148 and/or a detected seed and GPS location, whether for storing on map, in a database, or in any other form. In some examples, the processor 140 analyzes the signal or signals from various sensors, including other sensors 156, and determines measures of seed location and placement parameters such as desired planted seed orientation, seed spacing, percent good spacing, or a statistical measure of seed placement accuracy such as standard deviation of seed spacing or a coefficient of variation, etc. The display component may then display the measures of these seed placement parameters. Knowing the seed location and placement parameters may help an operator to understand, for example, what percentage of the seeds are within a desired tolerance range or threshold for desired planted seed orientation and/or spacing. The operator may then make corrections to the seedbed maker 130 as described in U.S. Patent Publication No. 2012/0004768, the entire contents of which are incorporated herein by reference, which discusses various types of seed placement and location parameters and measures of the seed placement parameters that may be determined by the processor 140, as well as how those measures may be displayed (see, e.g., paragraphs [0013]-[0037]).

In some examples, processor 140 receives a seed orientation instruction 148 from a database maintained by the operator or an entity affiliated with the operator. Further, the seed orientation instruction 148 may be uploaded to the processor 140 over a wireless communication network and/or uploaded manually or automatically depending upon the operator's location or desired intention to plant an agricultural field 90. In another example, the GPS receiver 150 unit is connected to the processor 140 to enable verification of a detected seed or planted seed orientation 149 (e.g., using a signal from seed detector 132) and GPS location for comparison against the seed orientation instruction 148. Seed orientation instruction 148 may be an a priori seed orientation map, a seed orientation map per georeferenced seed location, a rule set, a formula, a vector map, a raster map or any suitable format determining a preferred orientation for a given seed or seeds at a given location(s). In some examples, the seed orientation instruction 148 is generated using a set of rules that use in situ data to calculate the orientation without using a map as an intermediate data structure. Additionally, the seed orientation instruction 148 may use data which is georeferenced (e.g., a topographical map) or which is not georeferenced (e.g., a compass). When the seed orientation instruction 148 is an a priori seed orientation map, the map may further have management zones for a particular agricultural field 90. Each management zone in the map may have, without limitation, desired planted seed orientation 141 comprising orientation relative to the ground, orientation relative to North; orientation relative to direction of travel; and orientation such as pitch, roll, or yaw.

In one example, the seed orientation instruction 148 initially includes a desired planted seed orientation 141 calculated with the processor 140 other sensor data 146 from other sensors 156 independently of or in combination with the seed detector 132. Seed orientation instruction 148 may also later be updated with the planted seed orientation 149 determined and verified with the processor 140 and seed detector 132 For example, in some worksites, such as hilly worksites, pitch and roll data may be useful in fully controlling seed orientation. Other sensors 156 and sensor data 146 may be used to calculate planted seed orientation 149 without limitation.

Desired planted seed orientation 141 may also be calculated using seed data 147. Seed data 147 may include without limitation the type of crop, type of seed including size and shape (e.g., predominately flat, predominately round, large round, large flat, medium round, medium flat, small flat, small round), crop variety, seed geometry, roots relative to seed orientation, leaves relative to seed orientation and grain relative to seed orientation, plant height, leaf size, quantity of leaves, quantity of agricultural product (e.g., corn ears, soybean pods, etc.), size of agricultural product (e.g., corn tassel length, ear length/size, soybean pod length/size, etc.), root lodging, quantity of agricultural products dropped to the ground from the plant (e.g., dropped corn ears, dropped soybean pods, etc.), stalk lodging, plant appearance, stay green rating, crop rot (e.g., ear rot, kernel rot, stalk rot, etc.), intactness, grain quality rating, agricultural product shape (e.g., corn ear shape, etc.), ear type (e.g., flex, semi-flex or fixed), husk cover, kernel depth, shank length, cob diameter, moisture percent, brittle snapping, tassel branch angle, days to silk, pollen shed, leaf sheath pubescence, quantity of leaves above top ear node, lateral tassel branches, number of ears per stalk husk color, leaf waves and creases, ear taper, length of internode, length of tassel, kernel rows, kernel length, kernel thickness, husk extension, position of ear, Goss' Wilt and Stewart's Wilt ratings, leaf blight, gray leaf spot rating, kernel pop score, southern rust rating, or any other agricultural characteristic.

While each seedbed maker 130 could have its own sensor suite, it is anticipated that in some example implementations, there are sensors providing data to several seedbed makers 130 over wired or wireless communications means such as CAN bus or Wi-Fi. Position and heading may come from a single global navigation system receiver located on agricultural vehicle (e.g., tractor) 300, implement or both. Utilizing position and heading inputs, geometry techniques can be applied to determine the location and heading of a seedbed maker 130 on a towed toolbar. Heading and position inputs can, as described previously, may come from the global navigation satellite system (GNSS) receiver 150 (e.g. GPS receiver) or any localization system reporting in any global or local coordinate system. In one example, heading may be obtained from an electronic compass and may be relative to true or magnetic north.

Similarly, processing may be done on a single processor 140 dedicated to a seedbed maker 130, distributed to a single processor 140 dedicated to controlling multiple seedbed makers 130, distributed across processors 140 on the agricultural vehicle 300, on the implement, or in a remote location etc. While this description is focused on corn and singulated metering thereof, it may also be applied without limitation to other crops and other metering approaches such as volumetric metering, seed pick-and-place, a priori orientation on seed tape, plug metering, etc.

Figure 2:
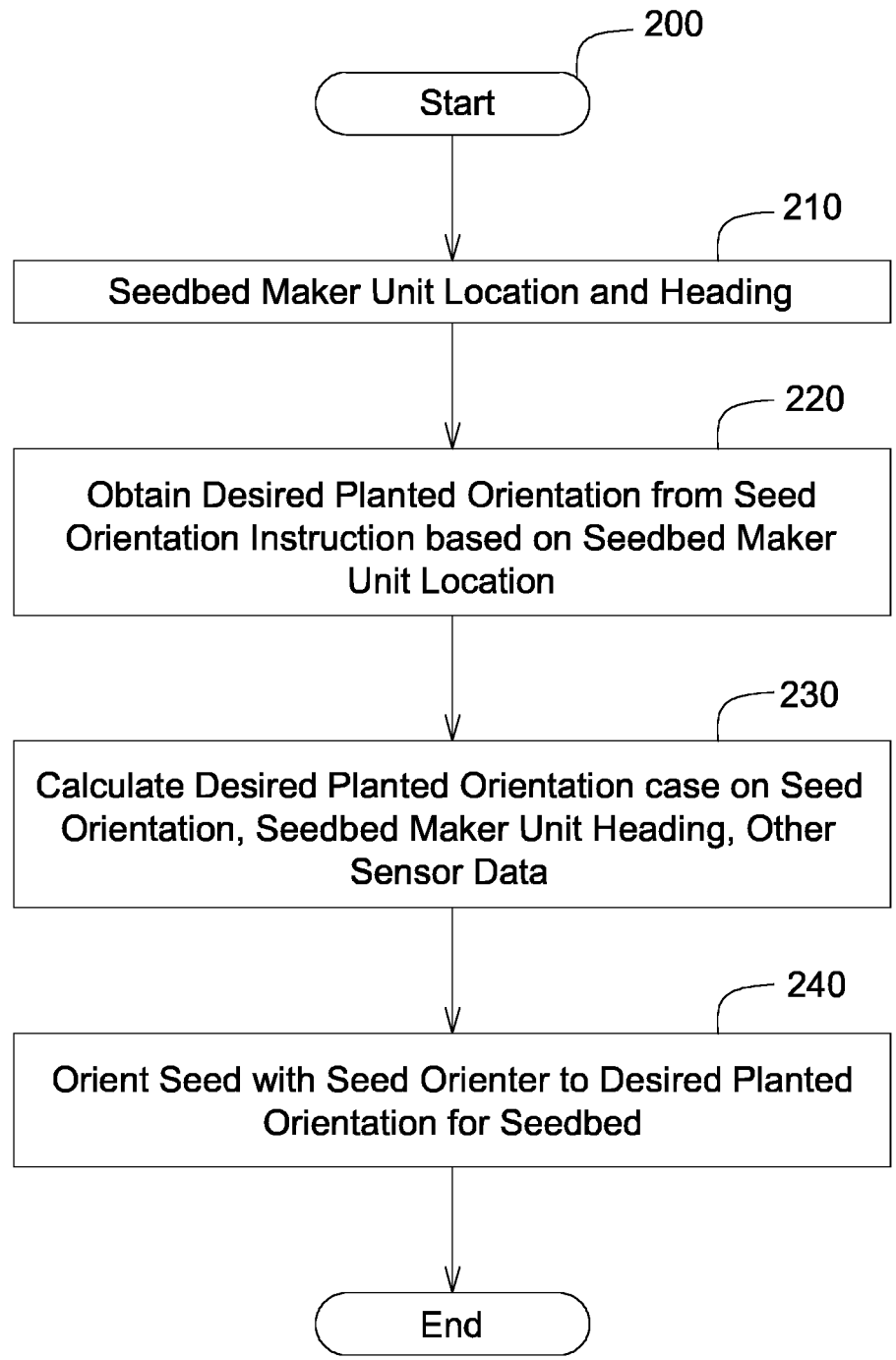
FIG. 2 is a flow diagram illustrating one example of a method for site specific seed orientation using an agricultural planter.

Referring now to FIG. 2, a flow chart for exemplary method of use of the system is shown. In a first step, position data corresponding to at least one of the agricultural vehicle 300, implement, seedbed maker location/position 142 and seedbed maker heading 144 is obtained. These inputs may be obtained from the global navigation satellite system (GNSS) receiver 150 (e.g. GPS receiver) or any localization system reporting in any global or local coordinate system. Heading may be obtained from a GNSS receiver, electronic compass, etc. Heading may be relative to true or magnetic north.

In a second step, desired planted seed orientation 141 is obtained from a seed orientation instruction 148 based on seedbed maker location 142 determined in the previous step. Again, a seed orientation instruction 148 may be an a priori seed orientation map, a seed orientation map per georeferenced seed location, a rule set, a formula, a vector map, a raster map or any suitable format determining a preferred orientation for a given seed or seeds at a given location(s). In some examples, the seed orientation instruction 148 is generated using a set of rules that use in situ data to calculate the orientation without using a map as an intermediate data structure. Additionally, the seed orientation instruction 148 may use data which is georeferenced (e.g., a topographical map) or which is not georeferenced (e.g., a compass). When the seed orientation instruction 148 is an a priori seed orientation map, the map may further have management zones for a particular agricultural field 90. Each management zone in the map may have, without limitation, desired planted seed orientation information such as: orientation relative to North; orientation relative to direction of travel; and orientation such as pitch, roll, or yaw.

In a third step, desired planted seed orientation 141 is determined from the seed orientation instruction 148, seedbed maker location 142 from the seedbed maker location sensor 152, seedbed maker heading 144 from the seedbed maker heading sensor 154, other sensor data 146 and other sensors 156. With respect to step 4, the seed 124 may be oriented with seed orienter 120 to the desired planted seed orientation. As previously described, seed orienter 120 may include adjustment of the seed orientation at one or more locations on the seedbed maker 130 including, for example, the seed meter 122, seed delivery system 126, or seed detector 132. Seedbed maker 130 may include one or more components at various locations such as positioning device 134, seed rotator 136 and/or seedbed closer 138 to further adjust orientation of the seed relative to the desired planted seed orientation 141.

In other examples, additional steps may be provided and include seed orientation using an open or closed loop control on processor 140. The open and closed control loop orientation control may utilize a seed detector 132, such as a camera, to verify seed orientation by observing actual planted seed orientation 149 and sending a representative signal to the processor 140 for comparison against the desired planted seed orientation 141. The seed detector 132 may be disposed in locations such as the seed meter 122, the seed delivery system 126, the seedbed 105 or at some other point prior to the seed 124 being covered by soil 95. Upon comparing the actual planted seed orientation 149 to the desired planted seed orientation 141 and, if applicable, determining that a tolerance or threshold has been exceeded, the processor 140 may initiate adjustments of the seed orienter 120 needed to bring the actual planted seed orientation 149 in line with the desired planted seed orientation 141.

Figure 3:
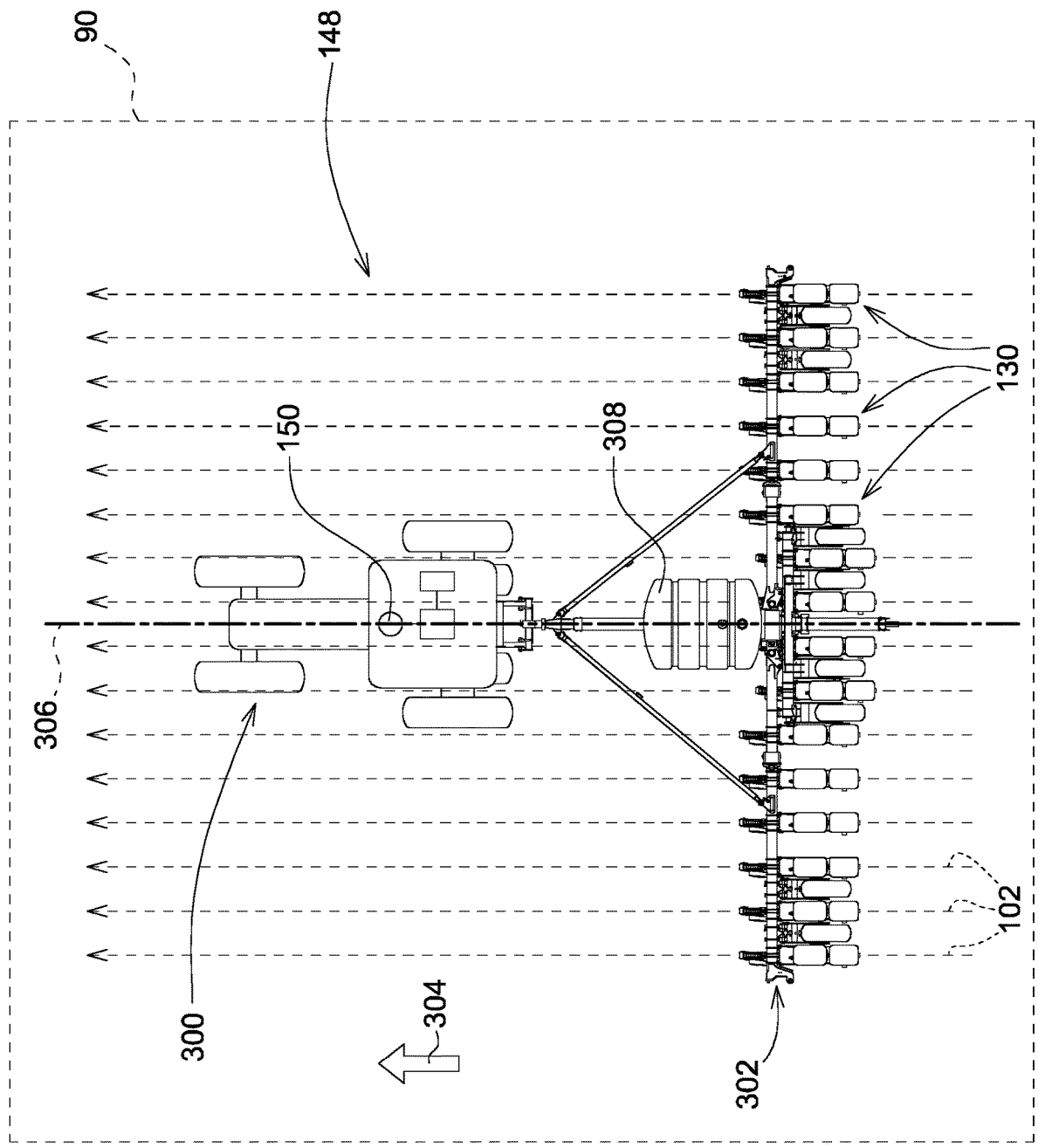
FIG. 3 illustrates an example image of an agricultural planter with a plurality of seedbed makers having a plurality of corresponding crop rows.

Referring now to FIG. 3, an agricultural vehicle (e.g., tractor) 300 is shown pulling a planter 302 having a main frame with a plurality of seedbed makers 130 in a direction of travel 304. In one example, the seedbed makers 130 are coupled (e.g., mounted) on a front or rear portion of the main frame, such that they are pulled over the surface of soil 95 in the agricultural field 90. Seed sources, such as storage tanks 308, are coupled to the main frame, and hold seed 124 that is delivered, e.g., pneumatically or in any other suitable manner, to a mini-hopper (not shown) associated with each seedbed maker 130. The storage tanks 308 are coupled to the mini-hoppers by way of conduits, such as hoses, and a pressurized delivery apparatus (not shown). Each storage tank 308 may contain the same or different varieties of seed 124 to be planted in the soil 95. Each seedbed maker 130 is connected to a conduit such that it is in communication with a storage tank 308 to receive seed. As illustrated by way of example only in FIG. 1, each seedbed maker 130 further includes its own sub-frame to which the various components (e.g., seed meter 122, seed delivery system 126, seed detector 132, positioning device 134, seed rotator 136, seedbed closer 138, etc.) are mounted.

As shown in FIG. 3, the agricultural vehicle 300 follows one or more generated or programmed guidance lines 306 using receiver 150, the guidance lines further allowing for the creation and visualization of the one or more rows 102 along which seed orienter 120, specifically seedbed maker 130, will plant seed 124. The guidance line 306 can thus be used to guide agricultural vehicle 300 and planter 302 to, among other things, minimize compaction and reduce product application overlapping. In one example, FIG. 3 may further represent a seed orientation instruction 148 shown on a display component and visually representing a map by which the agricultural vehicle 300 and the seedbed maker 130 will plant seed. In this example, the rows 102 are dashed lines, each dash representing a potential location of a seed in a desired planted seed orientation.

Referring now to FIGS. 4-5, many possible desired planted seed orientations 141 are shown. In this example, the desired planted seed orientations 141 correspond to possible orientations of a corn seed 124. In this example, the seed 124 may be oriented in three dimensions (X, Y and Z) and in any amount relative the ground including: 1) on its side with the embryo (not shown) pointed down or upwards relative to the soil surface or 2) with the caryopsis 400 of the seed 124 pointed down or upwards relative to the surface of soil 95. Additionally, the seed 124*a* may be oriented perpendicular to a crop row 102 or the seed 124*b* may be oriented parallel to the crop row 102. In one example, as shown in FIG. 5, the seed 124*a* is oriented with its caryopsis 400 pointed down and at an angle substantially parallel to the crop row 102 and surrounded by soil 95. When the caryopsis 400 is pointed down within soil 95 and the seed 124*a* is parallel to the row 102, it can be expected with reasonable certainty the plant will emerge uniformly and grow with its leaves perpendicular to the row 102. This is best demonstrated by the corn plant 160 depicted in FIG. 5. In this position, the plant will be in optimal contact with the soil 95 and allowing for uniform emergence and plant growth, optimal and uniform utilization of inputs such as light, water and nutrients, and avoiding other causes of yield loss such as soil compaction or machine contact with the plant or grain. In another example, when the caryopsis 400 is pointed down within soil 95 but the seed 124*b* is perpendicular to the row 102, it can be expected with reasonable certainty the plant will emerge and grow with its leaves parallel to the row 102. This is best demonstrated by the corn plant 162 depicted in FIG. 5.

However, it can be appreciated that one or more desired planted seed orientations 141 of a crop seed may be necessary to achieve optimal spacing and orientation to maximize a crop yield in an agricultural field 90. For example, in some agricultural fields, such as those with hills, terraces or other natural or manmade features, it may be desirable to utilize multiple planted orientations or desired planted seed orientations 141 based on topography to optimally capture sunlight or precipitation. In another example, the desired planted seed orientation 141 may change according to the type of crop (e.g., soybean, sugar beets, sunflowers, oats, sorghum, wheat) being planted and be altogether different or some combination of the desired planted seed orientations 141 as shown in FIGS. 4-5. In still yet another example, the desired planted seed orientation 141 may change according to the type of seed (e.g., flat or round corn seed) being planted, thus requiring one or more different desired planted seed orientations. Thus, as can be appreciated by one of ordinary skill, the desired planted seed orientations 141 as shown in FIGS. 4-5 are illustrative only and do not include all the desired planted seed orientations 141 which may be utilized for optimally planting and growing a crop in an agricultural field 90.

In one example, the processor 140 may be comprised of one or more of software and/or hardware in any proportion. In such an example, the processor 140 may reside on a computer-based platform such as, for example, a server or set of servers. Any such server or servers may be a physical server(s) or a virtual machine(s) executing on another hardware platform or platforms. Any server, or for that matter any computer-based system, systems or elements described herein, will be generally characterized by one or more processors and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the processor(s) and for storing temporary variables or other intermediate information during the use of the system and computing element described herein.

In one example, the processor 140 may also include a static storage device such as, for example, read only memory (ROM), for storing static information and instructions for the processor(s). In one example, the processor 140 may include a storage device such as, for example, a hard disk or solid state memory, for storing information and instructions. Such storing information and instructions may include, but not be limited to, instructions to compute, which may include, but not be limited to processing and analyzing agronomic data or information of all types. Such data or information may pertain to, but not be limited to, weather, soil, water, crop growth stage, pest or disease infestation data, historical data, future forecast data, economic data associated with agronomics or any other type of agronomic data or information.

In one example, the processing and analyzing of data by the processor 140 may pertain to processing and analyzing agronomic factors obtained from externally gathered image data, and issue alerts if required based on pre-defined acceptability parameters. RAMs, ROMs, hard disks, solid state memories, and the like, are all examples of tangible computer readable media, which may be used to store instructions which comprise processes, methods and functionalities of the present disclosure. Exemplary processes, methods and functionalities of the processor 140 may include determining a necessity for generating and presenting alerts in accordance with examples of the present disclosure. Execution of such instructions causes the various computer-based elements of processor 140 to perform the processes, methods, functionalities, operations, etc., described herein. In some examples, the processor 140 of the present disclosure may include hard-wired circuitry to be used in place of or in combination with, in any proportion, such computer-readable instructions to implement the disclosure.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of a skilled artisan in light of this disclosure. In addition, those skilled in the art will appreciate that the mechanisms of the subject matter described herein are capable of being distributed as a program product in a variety of forms, and that an illustrative embodiment of the subject matter described herein applies regardless of the type of signal bearing medium used to carry out the distribution. Examples of a signal bearing medium include, but are not limited to, the following: an edge computing module or device; a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected," or "operably coupled," to each other to achieve the desired functionality, and any two or more components capable of being so associated can also be viewed as being "operably couplable," to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a computer system or computing element (or portion thereof) such as, but not limited to, one or more or some combination of: a visual organizer system, a request generator, an Internet coupled computing device, a computer server, etc. In one example, the computer system and/or the computing element may manipulate and transform information and/or data represented as physical (electronic) quantities within the computer system's and/or computing element's processor(s), register(s), and/or memory(ies) into other data similarly represented as physical quantities within the computer system's and/or computing element's memory(ies), register(s) and/or other such information storage, processing, transmission, and/or display components of the computer system(s), computing element(s) and/or other electronic computing device(s). Under the direction of computer-readable instructions, the computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

What is claimed is:

1. A method for planting a seed in an agricultural field, the method comprising:
    determining, with a processor, a position of a seed orienter within the agricultural field using position data from at least one of a planter or an agricultural vehicle;
    generating a seed orientation instruction, wherein the seed orientation instruction is generated based on reducing future contact with machinery or future contact with a machinery effect;
    determining, with the processor, a desired planted seed orientation from the seed orientation instruction, the desired planted seed orientation corresponding to the position of the seed orienter within the agricultural field; and
    planting the seed with the seed orienter according to the desired planted seed orientation within the agricultural field.

2. The method of claim 1 desired planted seed orientation wherein, the seed orientation instruction is stored on the processor or transmitted to the processor prior to planting the seed according to the desired planted seed orientation.

3. The method of claim 2 wherein the seed orientation instruction is a map generated using at least one of seed data or topographical data for the agricultural field.

4. The method of claim 3 wherein the desired planted seed orientation is generated using at least one of a leaf orientation, root orientation, grain position, topography, row direction, future equipment paths, and tramline proximity.

5. The method of claim 4 wherein the desired planted seed orientation comprises a three-dimensional position of the seed relative to at least one of a surface plane of the agricultural field, a planting depth and a crop row within the agricultural field.

6. The method of claim 1 further comprising determining a site-specific seed orientation instruction for the agricultural field.

7. The method of claim 1 wherein the seed orientation instruction is generated further based on one or more of topography, row direction, future equipment paths, and tramline proximity.

8. The method of claim 1 wherein the seed orientation instruction is generated further based on one or more of leaf orientation, root orientation, or grain position.

9. The method of claim 8 wherein the seed orientation instruction comprises three-dimensional positions of the seed relative to at least one of a surface plane of the agricultural field, a planting depth, and a crop row within the agricultural field.

10. The method of claim 9 further comprising planting the seed according to the seed orientation instruction, the seed orientation instruction containing a three-dimensional position of the seed in a position relative to the crop row.

11. The method of claim 1 wherein the machinery effect is a high soil compaction zone or a nutrient zone with excessive or deficient nutrient availability.

12. The method of claim 1 further comprising determining a site-specific desired planted seed orientation for the agricultural field.

13. The method of claim 1 wherein the seed orienter further comprises a seedbed maker, the seedbed maker further comprising a seed meter, a seed delivery system, a seed detector, a positioning device and a seedbed closer configured for planting the seed within a seedbed according to the desired planted seed orientation.

14. The method of claim 13 wherein the seedbed maker is configured for planting the seed within a seedbed in the desired planted seed orientation.

15. The method of claim 14 wherein the seed is planted within the seedbed, the seedbed comprising at least one of a furrow, a pocket, an opening a hole or an indentation within which the seed can deposited and covered with soil.

16. The method of claim 13 wherein the seed orienter is configured to plant an altered seed, the seed orienter reacting to a characteristic of the altered seed and adjusting an orientation of the altered seed according to the desired planted seed orientation.

17. The method of claim 16 wherein the altered seed has a magnetic material affixed and the seed orienter includes a portion reactive to the magnetic material to substantially align the seed in the desired planted seed orientation.

18. An apparatus to plant a seed in an agricultural field with a planter according to a seed orientation instruction, the apparatus comprising:
at least one memory;
instructions; and
processor circuitry to execute the instructions to:
determine a position of the planter within the agricultural field;
determine the seed orientation instruction for the position of the planter within the agricultural field, wherein the seed orientation instruction is generated based on reducing future contact with machinery or future contact with a machinery effect;
plant the seed according to the seed orientation instruction at the position in the field; and
verify that a planted seed orientation at the position in the field corresponds to the seed orientation instruction.

19. The apparatus of claim 18 wherein the machinery effect is a high soil compaction zone or a nutrient zone with excessive or deficient nutrient availability.

20. The apparatus of claim 19 wherein the processor circuitry is to execute the instructions to plant the seed according to the seed orientation instruction with a seed orienter, the seed orienter comprising a seedbed maker, the seedbed maker further comprising a seed meter, a seed delivery system, a seed detector, a positioning device and a seedbed closer configured for planting the seed within a seedbed in the agricultural field according to a desired planted seed orientation.

21. The apparatus of claim 20 wherein the seedbed maker is configured for planting the seed within the seedbed according to the seed orientation instruction.

22. The apparatus of claim 21 wherein the seed is planted within the seedbed, the seedbed comprising at least one of a furrow, a pocket, an opening a hole or an indentation within which the seed can deposited and covered with soil.

23. The apparatus of claim 20 wherein the processor circuitry is to execute the instructions to determine a position of the planter using a position sensor associated with the seed orienter on the planter.

24. The apparatus of claim 20 wherein the processor circuitry is to execute the instructions to determine a position of the planter using a position sensor associated with the seedbed maker on the planter.

25. The apparatus of claim 20 wherein the processor circuitry is to execute the instructions to determine a position of the planter using a position sensor associated with an agricultural vehicle.

26. The apparatus of claim 19 wherein the processor circuitry is to execute the instructions to determine a site-specific seed orientation instruction for the agricultural field.

27. The apparatus of claim 19 wherein the seed orientation instruction is generated using at least one of a leaf orientation, root orientation, grain position, topography, row direction, future equipment paths, and tramline proximity.

28. The apparatus of claim 27 wherein the seed orientation instruction comprises a three-dimensional position of the seed relative to at least one of a surface plane of the agricultural field, a planting depth and a crop row within the agricultural field.

29. The apparatus of claim 19 wherein the seed orientation instruction is a map generated using at least one of seed data or topographical data for the agricultural field.

30. The apparatus of claim 19 wherein the processor circuitry is to execute the instructions to determine a site-specific desired planted seed orientation from the seed orientation instruction.

31. The apparatus of claim 19 wherein the processor circuitry is to execute the instructions to determine a desired planted seed orientation from the seed orientation instruction.

32. The apparatus of claim 31 wherein the processor circuitry is to execute the instructions to generate the desired planted seed orientation using at least one of a leaf orientation, root orientation, grain position, topography, row direction, future equipment paths, and tramline proximity.

33. The apparatus of claim 18, wherein the processor circuitry is to execute the instructions to determine a position of the planter using a position sensor associated with the planter.

34. A method for planting a seed with a planter according to a seed orientation instruction for an agricultural field, the method comprising:
- determining, with a processor, a position of the planter within the agricultural field;
- determining, with the processor, the seed orientation instruction for the position of the planter within the agricultural field, wherein the seed orientation instruction is generated based on reducing future contact with machinery or future contact with a machinery effect;
- planting the seed according to the seed orientation instruction at the position in the field;
- determining if a planted seed orientation of the seed at the position in the field corresponds to the seed orientation instruction; and
- adjusting the planted seed orientation if the planted seed orientation at the position in the field does not correspond to the seed orientation instruction.

35. The method of claim 34 wherein the machinery effect is a high soil compaction zone or a nutrient zone with excessive or deficient nutrient availability.

36. The method of claim 34 wherein the step of adjusting the planted seed orientation comprises adjusting at least one of a pitch, roll and yaw of the seed.

37. The method of claim 36 wherein the step of adjusting the planted seed orientation occurs prior to the seed being covered by soil in a seedbed.

38. The method of claim 34 further comprising the step of adjusting a shape of a seedbed based at least in part to the seed orientation instruction.

39. The method of claim 34 wherein the step of adjusting the planted seed orientation comprises adjusting the position of the seed relative to the position of a previously planted seed.

40. The method of claim 34 wherein the step of adjusting the planted seed orientation comprises adjusting the position of the seed within a crop row relative to the position of a previously planted seed.

* * * * *